United States Patent [19]
Jenkins

[11] 3,990,464
[45] Nov. 9, 1976

[54] HEAT-RESPONSIVE DUCT CLOSING METHOD AND APPARATUS
[76] Inventor: James H. Jenkins, 6010 26 St. N., Arlington, Va. 22207
[22] Filed: Apr. 8, 1975
[21] Appl. No.: 566,626

[52] U.S. Cl. .................................. 137/1; 137/72; 98/1; 138/93; 169/48; 251/12; 251/61.1; 251/DIG. 2
[51] Int. Cl.² .......................................... E03B 1/00
[58] Field of Search ............. 98/1, 86; 138/93, 89, 138/97; 150/1; 206/522; 236/16-19; 137/72, 251, 73, 74, 75, 1; 169/19, 42, 48; 251/12, 61.1, DIG. 2

[56] References Cited
UNITED STATES PATENTS
3,592,207   7/1971   Borello ................................. 98/1

Primary Examiner—Houston S. Bell, Jr.
Attorney, Agent, or Firm—Depaoli & O'Brien

[57] ABSTRACT

A method and apparatus are disclosed for controlling the passage of air, smoke and noxious fumes through the heating and ventilating ducts of a building by means of a normally-collapsed, leak-proof bag which expands upon activation by smoke detection means to completely seal the duct from the passage of air and smoke.

14 Claims, 3 Drawing Figures

HEAT-RESPONSIVE DUCT CLOSING METHOD AND APPARATUS

BACKGROUND OF THE INVENTION

1. Field of the Invention

This invention relates to protecting the occupants of a burning building from exposure to visible smoke and noxious fumes. It further relates to preventing the spread of smoke through the upper floors of a burning building. It particularly relates to controlling the lateral and vertical passage of smoke and air through ducts, ventilation passages, and air-conditioning conduits of burning buildings.

2. Review of the Prior Art

Because fire retardants are combustion inhibitors which promote smoldering rather than burning and further because fire retardants are presently used widely for treating wood, furniture materials, draperies, and the like, there is an increasing tendency to produce killer gases, such as carbon monoxide, when fires occur in homes and large buildings such as offices, apartment buildings, hotels, hospitals, and the like. Carbon monoxide is particularly dangerous because its affinity for human blood is 300 times greater than that of oxygen so that it displaces oxygen very rapidly from the blood. In consequence, an atmosphere containing 0.1% CO causes a severe headache and nausea within an hour and can cause coma within 2 hours and death within 4 hours.

Smoke is herein defined to include the invisible gaseous products of early combustion of burning organic materials, particularly including carbon monoxide, as well as the visibility-obscuring gaseous suspension of submicroscopic particles which is commonly recognized. Smoke herein further includes any chemical fumes and noxious gases such as are produced by chemical reactions or spillage of chemicals from tank cars or storage tanks. Smoke herein additionally includes heated but uncontaminated air at a temperature too high for life to endure. As so defined, smoke kills four out of five fire victims by asphyxiation before contact with heat or flames.

The generation of smoke, moreover, is but a part of the problem of protecting the occupants of a burning building; its rapid lateral and vertical transmission through modern ventilation, heating, and air-conditioning systems causes many fatalities far in advance of the fire or even after the fire has been localized or substantially extinguished.

When a fire begins in the vicinity of the furnace in a large building, various steel fire dampers, installed in the ducts in front of and behind the furnace and generally conforming to NFPA No. 252, "Standard Method of Fire Tests of Door Assemblies," close automatically. Such dampers generally have an interlocking blade design and are fitted with a spring catch requiring manual resetting whenever fully closed. They posses at least a 1½ hour National Fire Protection Association (NFPA) rating and are closed when a fusible link separates.

Fires can also begin in an upper floor of a large building, particularly in storage rooms containing, for example, paints, solvents, and the like or mattresses, bedding, and the like. Because flames can not reach beyond twenty feet within a duct, fire dampers are ordinarily placed in the vicinity of the furnace but not throughout the building. Smoke from fires originating in an upper room can thus travel both laterally and vertically with relatively little hindrance through the duct system, particularly if the room is provided with a register or a diffuser and the duct system is under relatively low pressure. If the duct system is under relatively high pressure, however, the smoke may instead diffuse throughout the floor on which the room is located.

According to National Fire Protection Association Pamphlet 90A, a smoke damper is a damper arranged for automatically interrupting air flow through a part of an air duct system so as to restrict passage of smoke, but it need not meet all the requirements of a fire damper.

Smoke dampers are commercially available. One form uses interlinked steel louvers which descends when a fusible link separates, but such a damper is not and can not be completely sealed at its edges so that it merely delays and minimizes the movement of smoke through ducts. Consequently, there is a need for a smoke blocking device which can completely seal a duct and thereby prevent smoke from spreading laterally and vertically through a burning building or which can snuff a fire by preventing access of fresh air thereto through a duct.

SUMMARY OF THE INVENTION

It is accordingly an object of this invention to provide a smoke blocking device which is capable of completely sealing a duct so that smoke can not leak therethrough from a fire and air can not leak therethrough to a fire.

It is an additional object to provide a smoke blocking device which can withstand temperatures of at least 600° F. while mounted within a duct.

It is also an object to provide a smoke blocking device which is selectively activated by flame, smoke, heat, or rate-of-rise in temperature, and the like.

It is further an object to provide a smoke blocking device which selectively utilizes a liquid, a pressurized gas, or a chemically released gas.

An additional object is to provide a method for utilizing the smoke blocking device of this invention so that both fires and smoke originating anywhere in a tall building can be promptly localized and fires can even be snuffed in cooperation with fireproof doors.

In satisfaction of these objects and in accordance with the spirit of this invention, a smoke blocking device is herein described which comprises a detection means for detecting evidence of combustion; a collapsible and leak-proof bag which is compressed into a small space when in its collapsed state and is in sealing relationship with the walls of a duct when in its inflated state; a bag-inflating means which is automatically connected to the bag; and an activation means for activating the bag-inflating means that is operable by the detection means.

The bag is constructed so that it closely conforms to, and expands tightly against, the walls of the duct when filled by the bag-inflating means. It is made of a heat-resisting material, such as tightly woven glass fabric, that is covered by a heat-resistant polymer, such as silicone polymer. It preferably also has an exterior surface that is heat reflecting, such as sprayed or vacuum-deposited aluminum metal.

The bag-inflating means is selectively a compressed gas which is stored in a cylinder therefor (such as air, nitrogen, or carbon dioxide), water, an aqueous solution containing a fire-retardant chemical, a gas produced by a heat-decomposable chemical, or a foamable polymer produced by heat-activated chemicals. The bag-inflating means can be located inside the bag itself or can be connected to the bag while located either inside or outside the duct. If water under pressure is the means for inflating the bag, the water can be supplied by a sprinkler system through a pressure-regulating valve. If a fire-retardant aqueous solution is used, it is preferably stored in a small tank located outside of the duct and forced into the bag by gas pressure.

The detection means for detecting evidence of combustion, such as flame, smoke, heat, rate-of-temperature rise, and the like, is a fusible cap or a smoke detector. The fusible cap, which may also be in the form of a fusible link or fusible seal, may be the sole detection means, as in water sprinkler systems, that operates by melting when its environment attains a selected temperature. It thereby combines the functions of both the detection means and the activation means. It may be designed to melt at any selected temperature from 100° F. to 220° F. Alternatively, the fusible cap may be electrically connected to a nearby or remotely located detection means which electrically melts the link so that the bag-inflating means is released, thus functioning as an activation means only. The smoke detector is selectively an electrically operated device of ionization type which responds to invisible combustion products, of photo-electric type which responds to visible smoke, or infra-red type which responds to the flame itself. Any such smoke detector transmits an electrical signal to the activation means.

The activation means may be a standard fusible cap blocking the connecting passage between the bag-inflating means to the collapsed bag, such as those commonly installed in sprinkler systems, that melts when its environment exceeds a selected temperature; ann electrothermal device, in combination with a fusible cap, that quickly melts the solder in the fusible cap by electrically generated heat when a preselected temperature, opacity of visible smoke, or naked flame is detected; a heat squib that comprises an exothermic chemical mixture which, when electrically actuated, gives off sufficient heat for melting the cap within a few seconds; or an explosive squib that comprises an explosive charge which is set off by an electric current from the detection means so that a frangible cap on the bag-inflating means is destroyed.

The device may be located entirely within the duct and thus be continuously exposed to the air flow through the duct. Alternatively and preferably, the duct may be provided with an outwardly protruding recess or pocket within which the device is positioned so that there is no disturbance of the air flow. This pocket may be provided with a hinged flap in order that inspections of the device can readily be made by maintenance personnel.

If the duct is square or rectangular in cross section, it can be sealed by a carefully designed bag. However, it is highly preferred to install a short insertion of cylindrical duct so that the bag can be readily inflated into tight conformity with its walls.

BRIEF DESCRIPTION OF THE DRAWINGS

The invention is shown in detail as a preferred embodiment in the accompanying drawings.

DESCRIPTION OF THE PREFERRED EMBODIMENT

Figure 1:
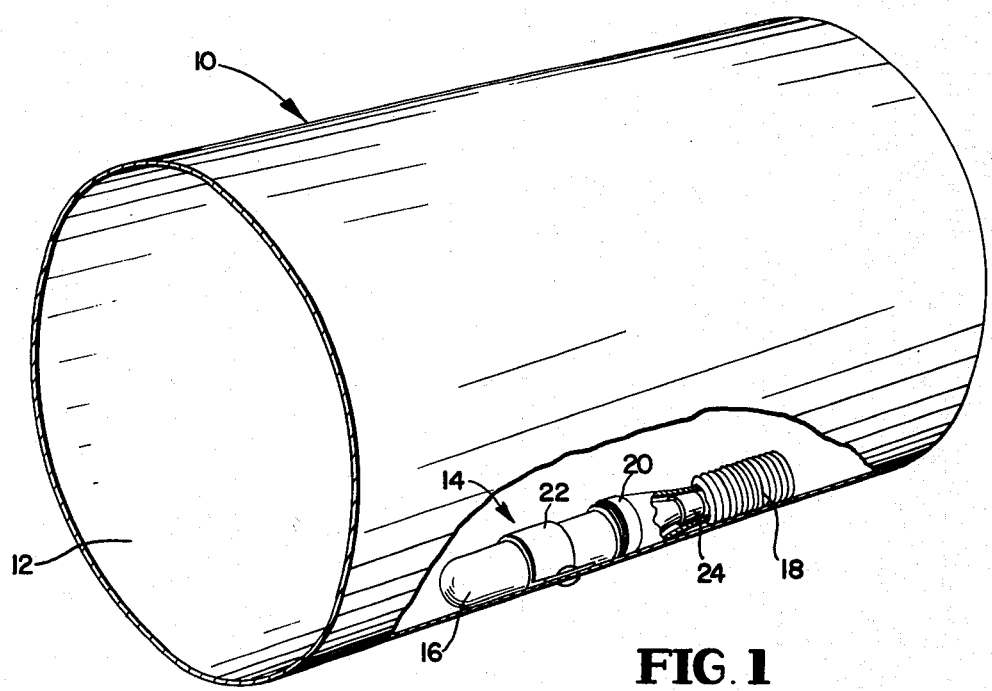
FIG. 1 is a perspective view of section of duct with a portion of wall broken away to show the device of this invention entirely therewithin as an inflatable bag in collapsed condition, a fusible link, and a $CO_2$-cartridge.

As shown in FIG. 1 a section of duct 10 having cylindrical walls 12 is provided with a smoke blocking device 14 which is attached to wall 12 with band 22. The device 14 further comprises cartridge 16, bag 18 in collapsed condition, fuseable cap 24 on cartridge and band 20 for attaching the bag 18 to the cartridge 16.

Figure 2:
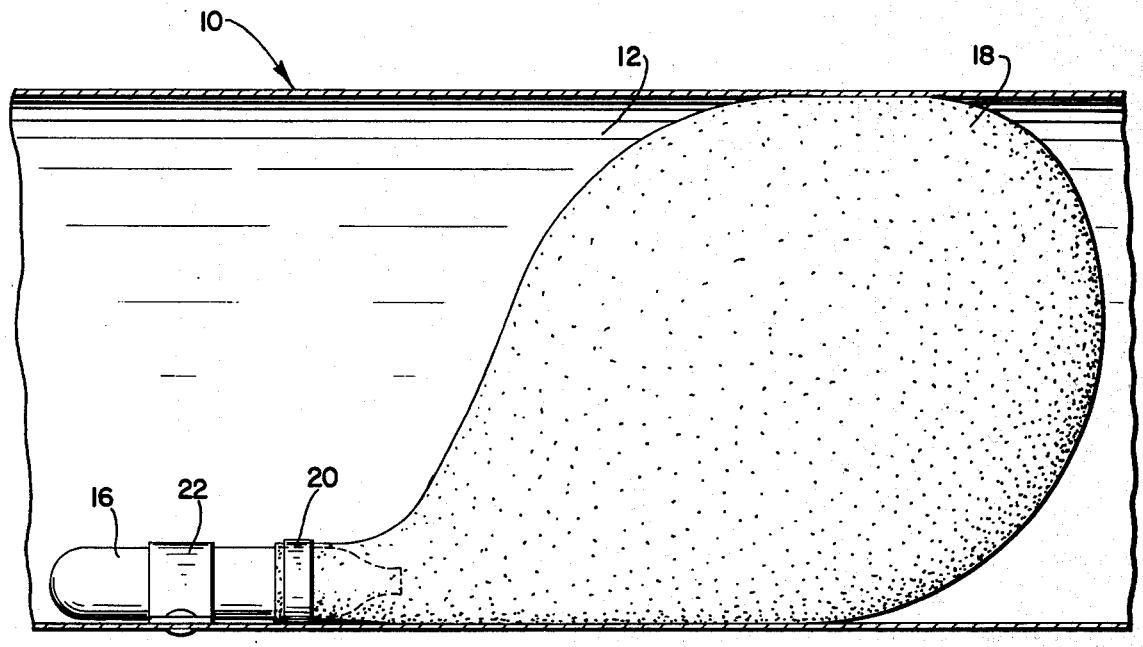
FIG. 2 shows the same duct in elevation as a cross section with the same bag in inflated condition and tightly engaging the walls of the duct so that no smoke whatsoever can pass therethrough.

In FIG. 2, the bag 18 is in inflated condition so that it seals the duct 10, completely blocking passage of any smoke therethrough, after the fusible cap 24 has been melted by the smoke passing through the duct.

However, because of the time required for gas-to-solid heat transfer, wherein significant and dangerous quantities of smoke pass through the duct 10 while heating the cap 24 to its fusion temperature (such as 175° F.), it is often preferred to detect the smoke by means of a separate detection means.

Figure 3:
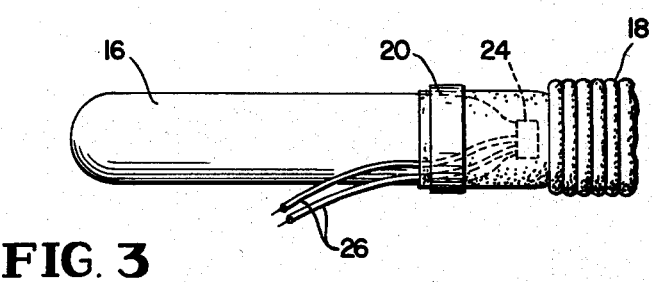
FIG. 3 is a detail view in elevation of a collapsed bag and a pressurized-gas cartridge that has a fusible cap which is connected to wires from a detection means so that the cap is electrothermally melted, thereby releasing gas under pressure from the cartridge into the bag.

The cartridge 24 is equipped in FIG. 3 with wires leading to such a smoke detection means which is remotely located and not shown in the drawings. When the smoke detection means is activated by smoke, it causes an electrical current to be transmitted to the cap 24 so that it is electrothermally melted, thus releasing the pressurized gas in the cartridge 16.

The smoke blocking device 14 can readily be mounted outside the duct by providing a protrusion or outwardly extending pocket into which the smoke blocking device 14 fits. This pocket can also be provided with a hinged access door for replacing the smoke blocking device 14 or its cartridge 16 when necessary.

The detection means can be mounted at any reasonable distance from the smoke blocking device 14, such as in an elevator shaft and chase or in a main vertical duct.

By constructing the bag 18 in large size and by using a source of compressed air or a cylinder of nitrogen, the smoke blocking device can be installed in a chase or elevator shaft and be designed, as by use of a plurality of relays and detection devices, so that the bag or a plurality thereof will inflate only between an elevator cage and the source of the smoke or heat, thereby preventing the elevator from travelling toward the fire and entrapping its passengers in a dangerous position.

Fires and smoke originating at a single location in a large building can also be localized by keeping all doors and windows closed and by placing a sufficient number of the smoke blocking devices of this invention throughout the horizontal and vertical duct system of the building. In particular, at least two of the snuffer-type smoke blocking devices of this invention must be placed at every tee intersection of ducts, three at every cross intersection of ducts, one close to each register, and one above each diffuser. To the extent that the fireproof doors surrounding the burning area can keep the area at least under positive pressure and preferably can exclude air entirely, the fire can thereby be substantially extinguished.

Because it will be readily apparent to those skilled in the art that innumerable variations, modifications, applications, and extensions of these embodiments and principles can be made without departing from the spirit and scope of the invention, what is herein defined as such scope and is desired to be protected should be measured, and the invention should be limited, only by the following claims.

What is claimed is:

1. The method of closing a heating and ventilating duct upon the occurrence of fire to prevent the flow of a gas through the duct, which comprises the steps of:
   a. arranging within the duct an impervious inflatable bag in the collapsed condition;
   b. connecting the bag with normally de-activated bag inflating means; and
   c. activating said bag inflating means when the temperature of the fluid in said duct exceeds a given value to expand said bag to an expanded condition in sealed engagement with the entire inner circumference of a portion of the duct, thereby to prevent the flow of fluid through the duct.

2. Apparatus for sealing a duct of a building upon the occurrence of a fire, comprising
   a. an inflatable impervious bag adapted for mounting in the collapsed condition within the duct;
   b. normally de-activated bag inflating means connected with said bag; and
   c. heat-responsive activating means for activating said bag inflating means to expand said bag to an expanded condition in sealed engagement with the entire inner circumference of a portion of the duct, thereby to prevent the flow of fluid through the duct.

3. The apparatus of claim 2, wherein said bag is formed of a heat-resisting material operable to withstand a temperature of 600° F. for at least 30 minutes.

4. The apparatus of claim 3, wherein said heat-resisting material comprises a closely woven glass fabric layer, and a heat-resistant silicone resin coating on said glass fabric layer.

5. The apparatus of claim 4, wherein the external surface of said bag is further coated with a layer of aluminum.

6. The apparatus of claim 2, wherein said bag-inflating means includes a source of compressed gas.

7. The apparatus of claim 2, wherein said bag-inflating means includes gas-producing heat-decomposable chemical means.

8. The apparatus of claim 2, wherein said bag-inflating means includes a source of water under pressure.

9. The apparatus of claim 8, wherein the building includes a water sprinkler system, said bag-inflating water source being adapted for connection with said sprinkler system.

10. The apparatus of claim 2, wherein said activating means includes heat responsive fusible cap means normally isolating said bag inflating means from said bag, whereby upon fusing of said cap means upon the occurrence of heat above a predetermined temperature, said bag inflating means is activated to expand the bag to its expanded condition.

11. The apparatus of claim 2, wherein said activating means includes electrically operable smoke detector means for activating said bag inflating means.

12. The apparatus of claim 11, wherein said activating means includes a heat-responsive fusible cap, and electrothermal means operable by said smoke detector means to effect melting of the fusible cap.

13. The apparatus of claim 11, wherein said activating means includes a heat-responsive fusible cap, and exothermic chemical means operable by said smoke detector means for melting the fusible cap.

14. The apparatus of claim 11, wherein said activating means includes a frangible cap connected between said bag-inflating means and said normally-collapsed bag, and further including explosive squib means operable by said smoke detector means for braking said frangible cap to activate said bag-inflating means.

* * * * *